W. S. GUNNING.
METHOD OF TREATING FLOUR.
APPLICATION FILED AUG. 19, 1915.
1,174,569.
Patented Mar. 7, 1916.
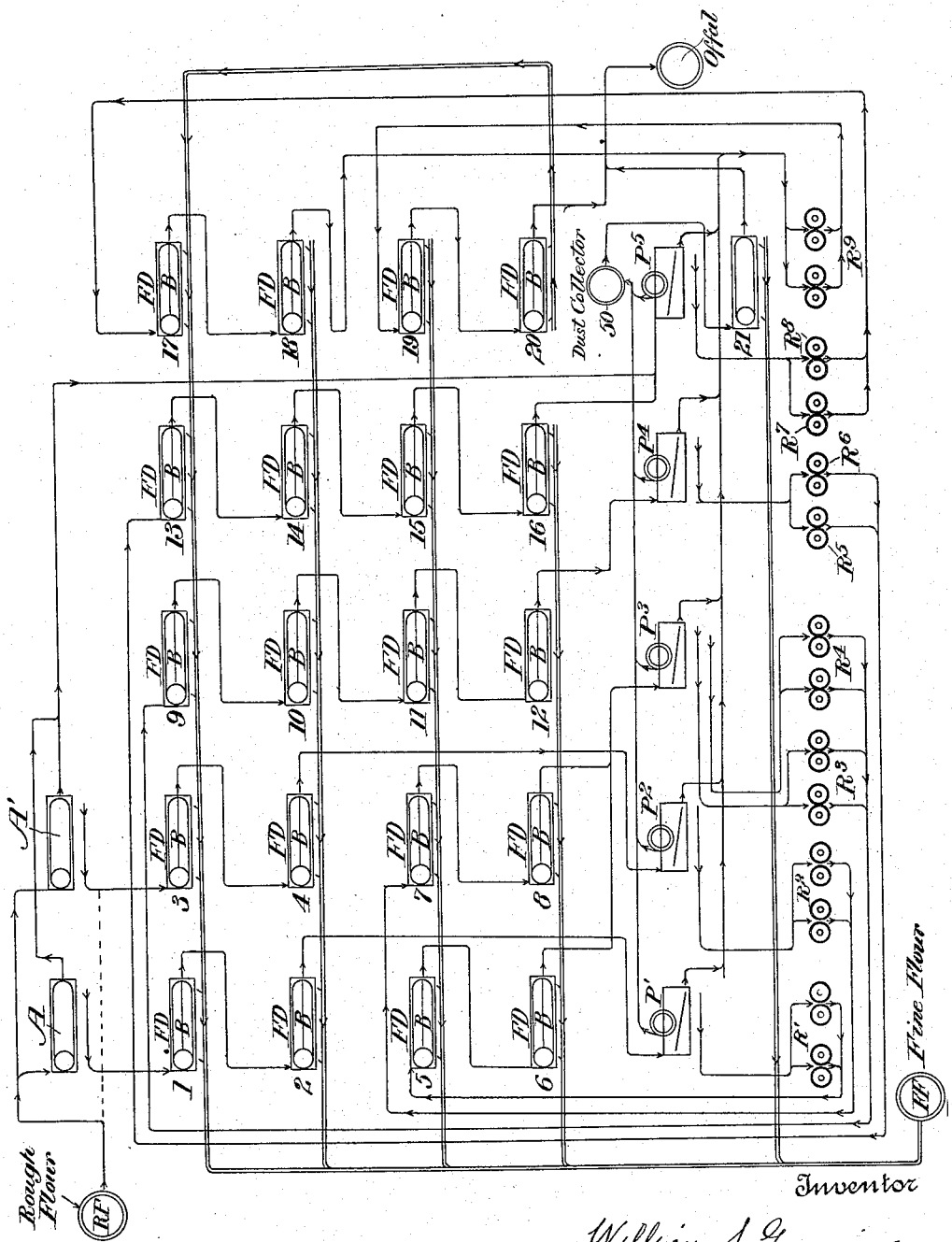

UNITED STATES PATENT OFFICE.

WILLIAM S. GUNNING, OF WEBB CITY, MISSOURI.

METHOD OF TREATING FLOUR.

1,174,569. Specification of Letters Patent. Patented Mar. 7, 1916.

Application filed August 19, 1915. Serial No. 46,279.

*To all whom it may concern:*

Be it known that I, WILLIAM S. GUNNING, a citizen of the United States, residing at Webb City, in the county of Jasper and State of Missouri, have invented certain new and useful Improvements in Methods of Treating Flour, of which the following is a specification.

This invention relates to a process for the treatment of flour, either as it is left by the ordinary milling operations, or of middlings as an ordinary mill prepares them for further milling purposes, whereby the treated flour is rendered whiter, and its baking qualities largely improved, in that, as compared with flour as made by ordinary milling, it produces more dough from a given quantity of flour, the dough rises more uniformly, the loaves are of greater weight, and the bread of much finer-grained and uniform texture and of improved taste.

My invention has for its object to produce an improved flour having the qualities above specified, and this object I attain by subjecting the flour, or the middlings, to a series of operations, whereby a product is obtained containing in an improved state of activity the desirable food materials which were contained in the flour or in the middlings, while the undesirable or waste materials which were contained in the flour or in the middlings are practically all removed; the particles of food materials being in a state of subdivision finer than that of ordinary flour, and of practically uniform size, in that all have been passed through a bolting-cloth or other screen of exceedingly fine mesh.

By my treatment the particles of starch and particularly of the gluten, are obtained in so fine a state of subdivision that a particularly strong flour having the highest baking value is produced.

In carrying out my process, the flour after it has passed through the ordinary and usual milling operations, or the middlings, as prepared by the customary milling process for further grinding, is passed through a series of successive disintegrating and cleaning steps. Each of these steps consists of a milling and a cleaning operation. The milling is effected by passing the flour through a pair of milling rolls, either of hardened iron, steel, or porcelain, and of the construction and arrangement such as are in ordinary use. The rolls may be driven at the usual speed of about 450–600 revolutions per minute, but I have found that the best results are obtained when the rolls operate at a three to one ratio; one roll rotating at 50 revolutions, and the other at 150 revolutions. The rolls are so set as to effect only a gentle reduction, *i. e.*, so that the larger particles of the flour are subjected to a cracking, or shattering action, without crushing or mashing of the particles into flakes, while the particles, if any, that do not need further cracking or shattering, pass between the rolls without being reduced. As the rolls are preferably operated at relative low speeds, undue heating of the particles of flour that need cracking or shattering is avoided. An appreciable rise in temperature has the deleterious effect of rendering the gluten particles of the flour soft and sticky, so that they cannot freely pass through the fine bolting-cloth used in my process, nor would they retain their normal activity in the baking process.

The cleaning operation consists in passing the material coming from the rolls through reels, or other bolting apparatus, covered by a bolting-cloth of very fine mesh. In practice, I prefer to use a bolting-cloth having not less than approximately 40,000 mesh-openings to the square inch, commercially known as No. 25 Standard; the less finely-meshed bolting-cloths used in ordinary flour-milling contain, approximately, 9409 to 29,929 meshes to the square inch and are commercially known as No. 9 Standard and No. 20 Standard, respectively. A cloth known as No. 14 Standard, which contains, approximately, 19,321 meshes to the square inch, is the popular size. Under my process, the fine, unheated material passing through the screens or bolting-cloths, is delivered to a collecting chamber or receptacle, preferably provided with an agitator, from whence, after becoming blended into all other materials that are delivered to the collecting chamber, the total, blended product is sent to the flour-bin as a whole.

The residual material rejected by the first screen, sieve or bolting-cloth operation, is then, preferably, subjected to a further cleaning and grading operation in a pneumatic or other purifier. While this purification step may be omitted, I prefer to use it, as there is effected thereby not only a very desirable removal of impurities, but any slight heat that may result from the milling or friction otherwise created, is removed, which obviates any tendency of the gluten particles to become soft or sticky, and leaves them in a better, because more brittle, condition, for the next reduction, and preserves the baking-value of the gluten.

The coarser material, whether coming directly from screens, sieves or bolting-machines, or purifiers, is then subjected to another series of milling and cleaning operations, conducted in the same manner as that above described. The product from each milling operation is passed through a reel or bolting-machine, clothed with bolting-cloth of the exceedingly fine mesh-openings above described, the material passing through each such very fine bolting-cloth being delivered to the collecting-chamber above referred to. The number of these successive operations may vary according to the character of the flour under treatment, but is continued until the material rejected by the last screen of the series has no value as flour, but is useful only for stock-food. In practice, I have found that from four to eight (though more or even a smaller number may be used) milling and screening or bolting operations are sufficient to produce a product of the improved quality, and I prefer to use in addition at least two purifying steps in the course of the treatment, and may use a purifying step after each screening or bolting operation.

The materials passing through the successive very fine bolting-cloths, or screening operations, are all conducted to the common collecting chamber, in which they are thoroughly blended or mixed to form my improved product.

As the result of the operations above referred to, I produce a product in an exceedingly fine state of subdivision,—much finer than any previously-made flour, and in a state of subdivision finer than has heretofore been considered of commercial value. The important flour particles, both the starch and gluten material, are so finely subdivided that they will pass through the fine-mesh screen, or bolting-cloth referred to, reduced to a substantial uniformity of size not heretofore attained. Further, substantially all the original content of gluten material in the flour (which it is possible to retain by practical operations) is retained in my new product in a finely-comminuted state, and in a condition of greater activity, and so completely broken up as to have the best baking-value, while the waste materials, in the shape of cell tissues or fiber or other undesirable form, have been, by the gentle reductions of the milling and re-milling operations and by successive purifications, practically entirely removed. The result being that the flour so produced is greatly improved as to color, strength, and baking qualities, in comparison with flours milled by the present day process of milling.

The product produced by my process, using as the starting material what is known in milling parlance as "100 per cent." or "straight grade" flour, still approximates a "100 per cent." flour, while it equals or excels in strength, color, and baking-value, the flours known as "Patents", which range in grade from about 10 per cent. to not more than 70 per cent.

The manner in which the process is carried out will be readily understood by those skilled in the art from the accompanying flow-sheet.

The course of the fine flour passing through the very fine silk bolting-cloth, No. 25 for example, is shown by double lines. The flour-dressers, shown conventionally, may be of any well known type, but are in practice entirely clothed with the exceedingly fine mesh silk bolting-cloth above referred to. The course of the material rejected by the screen ("offtails") is indicated by single lines.

The rough flour to be treated enters the refining system at the point R. F. If the rough flour requires it, or if the starting material is middlings, the stock may be first passed through rather coarsely clothed rotary screens, A, A', in order to preliminarily separate bran and other coarse material. When these preliminary screens A, A', are not used, the stock is divided between the flour dressers 1 and 3.

The fine stock or throughs from screens A, A, passes through the flour dressers 1 and 3, each of which has a clothing B of very fine silk bolting-cloth of the kind above described. The throughs from each of these flour dressers goes to the fine flour receptacle as indicated, (throughout the diagram) by the double lines.

The off-tails from flour dresser 1 go to flour dresser 2; the off-tails from flour dresser 2 go to purifier $P^1$; the throughs from purifier $P^1$ go to the first set of reduction rolls $R^1$; the ground stock from these rolls $R^1$ goes to flour dresser 5; the off-tails from flour dresser 5 go to flour dresser 6; the off-tails from flour dresser 3 go to flour dresser 4; the off-tails from flour dresser 4 go to purifier $P^2$; the throughs from purifier $P^2$ go to reduction rolls $R^2$; the ground stock from these rolls $R^2$ goes to flour dresser 7; the off-tails from flour dresser 7 go to flour dresser 8; the off-tails from flour dresser 8 joining the off-tails from flour dresser 6 go to purifier $P^3$.

The throughs from flour dressers 5, 6, 7, 8 go to the fine flour receptacle as indicated throughout the diagram. The throughs from purifier $P^3$ are divided between mills R³, R⁴; the ground stock from mills R³ and R⁴ goes to flour dresser 9; the off-tails from flour dresser 9 go to flour dresser 10; the off-tails from flour dresser 10 go to flour dresser 11; the off-tails from flour dresser 11 go to flour dresser 12; the throughs from flour dressers 9, 10, 11 and 12 passing to the fine flour receptacle as shown in diagram. The off-tails from flour dresser 12 go to purifier P⁴; the throughs from purifier P⁴ go to mills R⁵ and R⁶; the ground stock from mills R⁵ and R⁶ unite and go to flour dresser 13; the off-tails from flour dresser 13 go to flour dresser 14; the off-tails from flour dresser 14 go to flour dresser 15; the off-tails from flour dresser 15 go to flour dresser 16. The throughs from flour dressers 13, 14, 15 and 16 go the fine flour receptacle as indicated in diagram. The off-tails from flour dresser 16 uniting with the branny material from screens A, A' go to purifier P⁵. The throughs from purifier P⁵ are divided on mills R⁷ and R⁸. The ground stock from mills R⁷ and R⁸ unites and passes to flour dresser 17. The off-tails from flour dresser 17 go to flour dresser 18; the throughs from flour dresser 17 and 18 go to the fine flour receptacle as indicated in diagram. The off-tails from flour dresser 18 uniting with the off-tails from purifiers P¹, P², P³, P⁴ and P⁵ go to mill R⁹; the ground stock from mill R⁹ goes to flour dresser 19; the ff-tails from flour dresser 19 go to flour dresser 20; the throughs from flour dresser 19 and 20 go to the fine flour receptacle as indicated in diagram. The off-tails from flour dresser 20 go to the waste or offal 51.

The dust from the purifiers goes to a common receptacle known as dust collector 50, from which it is delivered to a final flour dresser 21, the throughs going to the fine flour receptacle as shown in diagram and the rejected portions to the offal 51.

It will be understood that this plan of operations may be readily modified and is given is simply as an example of the manner in which my process may be successfully practised.

It will be further understood that much must be left to the skill of the mill operator as to the adjustment of the rolls in the various mills, the rolls being set in every case to effect as gentle reductions as may be possible, and the finer the flour, the more gentle must be the grinding.

In the baking of bread from flour produced according to the above-described process, I have found that the flour rises more uniformly than is the case with flour manufactured in the customary manner; that the loaves produced from a given quantity of flour are larger than those produced from the same quantity of flour in the condition in which the millers usually leave it; that such loaves are of somewhat greater weight, because of the greater absorptive capacity of this homogeneous, finely-comminuted product, and that the texture of the bread is more finely-grained and uniform in appearance, presumably because of the removal of waste material and the fine subdivision of the gluten particles with their active qualities fully preserved; while the flour and the bread are whiter than flour of the same milling grade, and the bread made therefrom.

My invention is not in any manner limited to the use of any particular form or type of apparatus, as the mills, flour-dressers, purifiers and other devices are all such as are well known in the art.

It will be understood that the area of the mesh-opening in bolting-cloths is dependent not only upon the number of threads to the inch, but also upon the thickness of the threads used; thus a lower number cloth having thicker warp or weft threads than the standard size for that number, may have mesh-openings less in number than, but of the same mesh-openings area as those of a cloth of a higher number. Obviously, the same result as to fineness of product may be obtained by using either type of bolting-cloth. I prefer, however, to use the standard higher number cloths made of fine silk threads, as the screening action is more rapid and effective.

I claim:—

1. The process of improving ordinary flour, which consists in subjecting it to a series of reducing operations, each comprising grinding and bolting through bolting-cloths each having the same exceedingly fine mesh-openings, substantially as described; collecting and mixing the materials passing through said bolting-cloths, using the residual material from one bolting operation as the starting material for the next reducing operation, and subjecting the residual material from some, or all, of the bolting operations to the action of a purifier before the next following reducing operation.

2. The process of improving ordinary flour, which consists in subjecting it to a series of reducing operations, each comprising a gentle reduction in a grinding mill and a bolting step; the bolting-cloths used each having the same exceedingly fine mesh-openings substantially as described; collecting and mixing the materials passing through said bolting-cloths and using the residual material from one bolting operation as the starting material for the next reducing operation.

3. The process of improving ordinary flour, which consists in subjecting it to a series of reducing operations, each comprising a gentle reduction in a grinding mill at the relatively slow speeds described, and a bolting step; the bolting-cloths used each having the same exceedingly fine mesh-openings, substantially as described; collecting and mixing the materials passing through said bolting-cloths and using the residual material from one bolting operation as the starting material for the next reducing operation.

4. The process of improving ordinary flour, which consists in subjecting it to a series of re-milling operations, each comprising a gentle reduction in a grinding mill and a bolting-step, the bolting-cloths used each having the same exceedingly fine mesh-openings, substantially as described; collecting and mixing the materials passing through said bolting-cloths; using the residual material from one bolting-cloth as the starting material for the next reducing operation, and subjecting the residual material from some, or all, of the bolting operations to the action of a purifier before the next following re-milling operation.

5. The process of milling flour, which consists in subjecting the stock, either in the form of flour or middlings to the action of a series of mills, the ground material being passed through bolting-cloths, each of which has substantially the described exceedingly fine-mesh openings.

6. An improved white flour containing substantially all of the starch and gluten material of the flour or middlings from which the start was made but practically free from waste materials, the particles being in a substantially uniform state of subdivision finer than ordinary flour, and so fine that they will pass through a bolting-cloth having the exceedingly fine mesh-openings substantially as described.

7. An improved white flour made by re-milling ordinary flour in the manner described, and containing substantially all of the starch and gluten material of the flour from which the start was made, but practically free from waste materials, the particles being in a substantially uniform state of subdivision finer than ordinary flour, and so fine that they will pass through a bolting-cloth having exceedingly fine mesh-openings, substantially as described.

In testimony whereof I affix my signature.

WILLIAM S. GUNNING.

Copies of this patent may be obtained for five cents each, by addressing the "Commissioner of Patents, Washington, D. C."